United States Patent [19]

Jones

[11] Patent Number: 5,316,567
[45] Date of Patent: May 31, 1994

[54] HYDROMETALLURGICAL COPPER EXTRACTION PROCESS

[75] Inventor: David L. Jones, Delta, Canada

[73] Assignee: Cominco Engineering Services Ltd., Vancouver, Canada

[21] Appl. No.: 35,233

[22] Filed: Mar. 22, 1993

Related U.S. Application Data

[63] Continuation-in-part of Ser. No. 901,097, Jun. 19, 1992, Pat. No. 5,223,024.

[51] Int. Cl.$^5$ .............................................. C22B 1/00
[52] U.S. Cl. ...................................... 75/743; 75/726; 75/740
[58] Field of Search ........................ 75/726, 743, 740

[56] References Cited

U.S. PATENT DOCUMENTS

| | | | |
|---|---|---|---|
| 4,017,309 | 4/1977 | Johnson | 75/101 R |
| 4,039,406 | 8/1977 | Stanley et al. | 204/108 |
| 4,120,935 | 10/1978 | Fountain et al. | 423/41 |
| 4,266,972 | 5/1981 | Redondo-Abad et al. | 75/101 R |
| 4,338,168 | 7/1982 | Stanley et al. | 204/108 |
| 4,814,007 | 3/1989 | Lin et al. | 75/118 |
| 4,895,597 | 1/1990 | Lin et al. | 75/118 |
| 4,992,200 | 2/1991 | Lin et al. | 252/184 |
| 5,028,259 | 7/1991 | Lin et al. | 75/722 |
| 5,073,354 | 12/1991 | Fuller et al. | 423/24 |

FOREIGN PATENT DOCUMENTS

71/4981 7/1971 South Africa .
89/2733 4/1989 South Africa .

OTHER PUBLICATIONS

"Selectivity Considerations in the Amine Extraction of Gold From Alkaline Cyanide Solutions", M. B. Mooiman and J. D. Miller, *Minerals and Metallurgical Processing*, Aug. 1984, pp. 153–157.

*Primary Examiner*—Peter D. Rosenberg
*Attorney, Agent, or Firm*—Elbie R. De Kock; John R. Uren

[57] ABSTRACT

A process for the extraction of copper from a sulphide copper ore or concentrate comprises the steps of subjecting the ore or concentrate to agitation leaching at an elevated temperature and pressure to obtain a resulting acidic leach liquor containing dissolved copper and reducing the acidity of the resulting acidic leach liquor by effecting percolation leaching of a bed of low-grade copper ore or granular rock with the acidic leach liquor. The agitation leaching is carried out in two stages, i.e. a first leaching step at an elevated temperature and pressure in the presence of oxygen and an acidic chloride solution as lixiviant and a second leaching step at atmospheric pressure with an acidic sulphate solution. In a preferred embodiment, the bed of low-grade copper ore or granular rock is in the form of a heap and the percolation leaching comprises heap leaching. Copper is extracted from the leach liquor by solvent extraction. Solvent extraction is effected either before or after the heap neutralization leach depending on the nature of the copper ore or concentrate being treated.

12 Claims, 3 Drawing Sheets

HYDROMETALLURGICAL COPPER EXTRACTION PROCESS

CROSS REFERENCE TO RELATED APPLICATION

This application is a continuation-in-part of U.S. patent application Ser. No. 07/901,097 filed Jun. 19, 1992, now 5,223,024, the entire contents of which is incorporated herein by reference.

FIELD OF THE INVENTION

This invention relates to a process for the extraction of copper from copper ore or concentrates, in particular sulphide ores, in which the concentrate is subjected to acid leaching to extract the copper therefrom.

BACKGROUND OF THE INVENTION

Most copper ores or concentrates from which copper is extracted on a commercial scale contain copper in sulphide form, such as $CuFeS_2$ (chalcopyrite), $Cu_5FeS_4$ (bornite) and $Cu_2S$ (chalcocite) (hereinafter referred to as "sulphide ores"), as opposed to copper in oxide form (hereinafter referred to as "oxide ores").

Extraction processes for copper may be broadly classified into two categories, i.e. smelting and leaching. In general, smelting processes are applied to sulphide ores, whereas leaching is more often used with oxide ores. It is noted that the preliminary step of concentration of ores (by flotation) is usually applied to sulphide ores, not oxide ores.

The reasons for the differing treatment for the two types of ores are generally technical, and thus also economical. Sulphide ores float well, producing relatively high grade concentrates from low grade ores. These sulphide concentrates are well suited to the proven smelting process. Oxide ores on the other hand, do not concentrate easily and therefore it is difficult to provide a feed material that is sufficiently high grade for smelting. In addition, oxide ores do not have any natural fuel, comparable to the sulphur in sulphide concentrates. Fortunately though, oxide ores do leach easily in sulphuric acid solutions, and thus a sizeable industry has been established based on heap leaching of oxide ores, followed by solvent extraction and electrowinning.

Despite all of the above, smelting of sulphide ores has some serious drawbacks, mostly concerned with the need to avoid air pollution due to the sulphur gases emitted. In locations where there is no market or use for sulphuric acid, it is very difficult to justify a smelter on economic grounds, assuming it is not permitted to vent the gases freely to the atmosphere. Copper mines which produce sulphide concentrates in such locations usually ship the concentrates to distant (offshore) smelters. When smelting/refining/shipping charges are low, this may be economic, but there are times when the available world smelting capacity for custom concentrates is limited and, consequently, smelting charges rise sharply according to the law of the marketplace. At such times, concentrate producers may be placed at a severe disadvantage.

Therefore there is a need for an economical and technically sound leaching process that can treat sulphide concentrates at the mine site, particularly concentrates based on chalcopyrite, as this is the most widely distributed copper mineral worldwide.

One of the problems which arises with the leaching of copper from sulphide ore is that, while a high acid concentration may be desirable during the leaching stage, such a high concentration is undesirable during the subsequent solvent extraction stage, due to unfavourable equilibrium conditions which are created and leading to higher equipment and working costs. This requires neutralization in order to yield a pregnant liquor suitable for solvent extraction, rendering the process uneconomical, in particular where low grade ores are involved.

It is accordingly an object of the present invention to alleviate the above-mentioned difficulties.

SUMMARY OF THE INVENTION

According to the invention, there is provided a process for the extraction of copper from a sulphide copper ore or concentrate, comprising the steps of subjecting the ore or concentrate to leaching at an elevated temperature and pressure in the presence of oxygen and an acidic chloride solution as lixiviant; subjecting the product from said leaching at elevated temperature and pressure to a leaching at atmospheric pressure with an acidic sulphate solution to produce a leach liquor containing copper sulphate in solution; and reducing the acidity of said leach liquor by effecting percolation leaching of a bed of low-grade copper ore with said leach liquor, whereby the pH of the leach liquor is raised.

The bed may be in the form of a heap and the percolation leaching may comprise heap leaching.

Also according to the invention, there is provided a process for the extraction of copper from a sulphide copper ore or concentrate, comprising the steps of subjecting the ore or concentrate to leaching at an elevated temperature and pressure in the presence of oxygen and an acidic chloride solution as lixiviant; subjecting the product from said leaching at elevated temperature and pressure to a leaching at atmospheric pressure with an acidic sulphate solution to produce a leach liquor containing copper sulphate in solution; and reducing the acidity of said leach liquor by effecting percolation leaching of a bed of granular rock with said leach liquor, whereby the pH of the leach liquor is raised.

According to a further embodiment of the invention, there is provided a process for the extraction of copper from a sulphide copper ore or concentrate, comprising the steps of leaching the ore or concentrate at an elevated temperature and pressure with an acidic chloride solution to produce an insoluble basic copper salt; leaching the basic copper salt produced by the first leaching step at atmospheric pressure with an acidic sulphate solution to dissolve the basic copper salt to produce a leach liquor containing copper sulphate in solution; subjecting said leach liquor to a solvent extraction process to produce a copper concentrate solution and an acidic raffinate; and heap leaching a mass of low-grade copper ore by means of said acidic raffinate to raise the pH of said raffinate.

The soluble basic copper salt may comprise a mixture of basic copper chloride and basic copper sulphate.

Further according to the invention, there is provided a process for the extraction of copper from a sulphide copper ore or concentrate, comprising the steps of leaching the ore or concentrate at an elevated temperature and pressure with an acidic chloride solution to produce an insoluble basic copper salt; leaching the basic copper salt produced by the first leaching step at atmospheric pressure with an acidic sulphate solution to dissolve the basic copper salt to produce a leach liquor containing copper sulphate in solution; subjecting said leach liquor to a solvent extraction process to produce a copper concentrate solution and an acidic raffinate; and heap leaching a mass of granular rock by means of said acidic raffinate to raise the pH of said raffinate.

Further objects and advantages of the invention will become apparent from the description of a preferred embodiment of the invention below.

DETAILED DESCRIPTION OF PREFERRED EMBODIMENT

Figure 1:
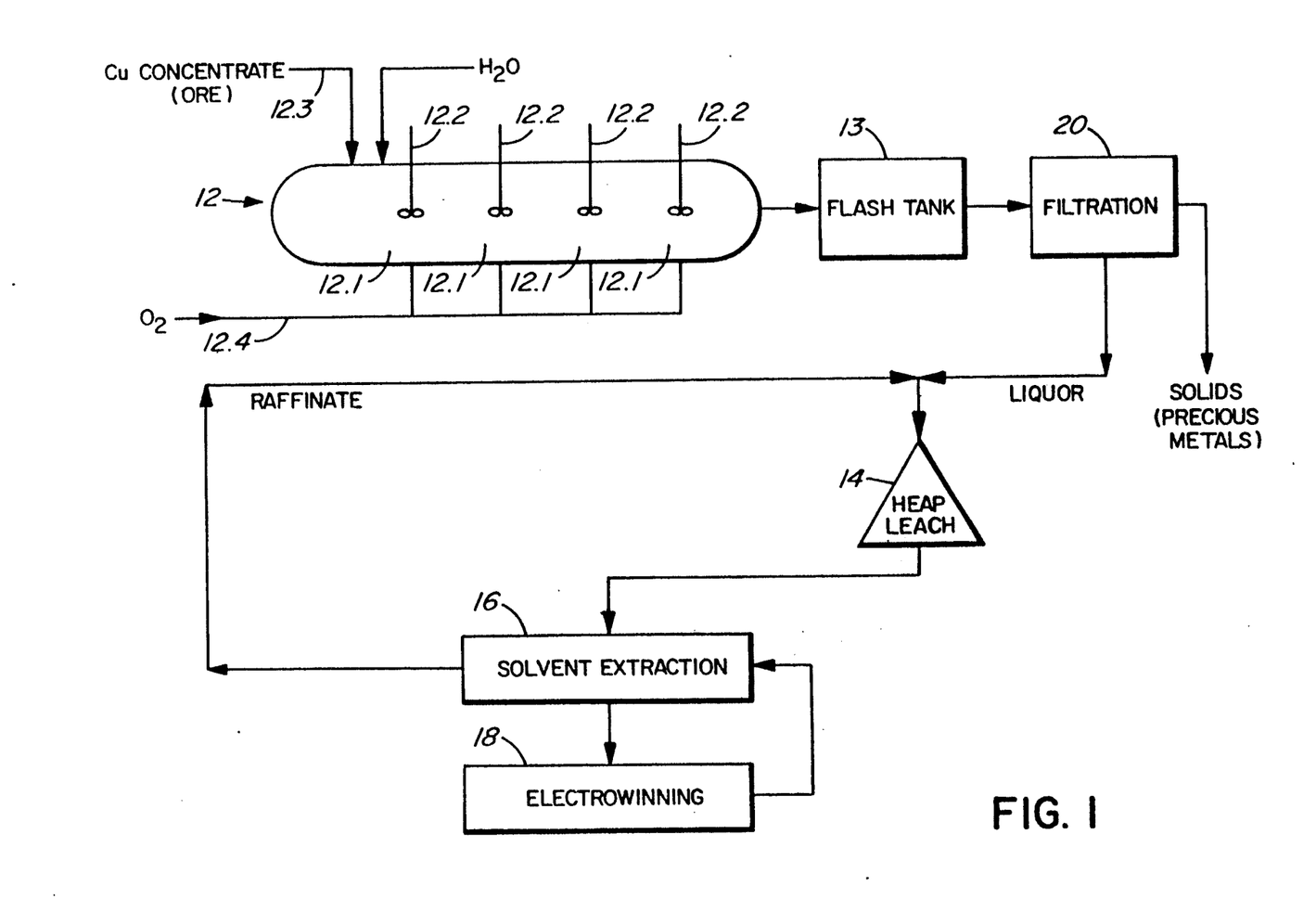
FIG. 1 is a flow diagram illustrating, by way of example, a copper extraction process according to one embodiment of the invention.

In order to be amenable to treatment by the process of FIG. 1, the copper ore or concentrate, being predominantly chalcopyrite in the present example, should be in finely divided particulate form. It is preferable that the starting material be at least 90% minus 325 mesh standard Tyler screen. In preparing a copper ore or concentrate for carrying out the extraction process, the concentrate is therefore reground, if necessary, to obtain a finely divided concentrate slurry with a moisture content of about 20–30%.

The concentrate slurry is then subjected to leaching with water in the presence of oxygen in an autoclave 12. The leaching is carried out at an elevated temperature, e.g. of about 180° C.–220° C., preferably about 200° C., and an oxygen partial pressure of about 150–300 psig (approximately 1000–2000 kPa). Water is continuously added during the pressure leaching process and a solids content of about 10–20% is maintained. The residence time in the autoclave 12 is about 0.5 to 2 hours under vigorous agitation.

The pressure leaching process can be carried out in one or more autoclaves. The autoclaves may be of the conventional type having several internal compartments, e.g., from two to eight, typically four, and provided with agitators in the compartments. In the present example a single autoclave 12 having four compartments 12.1, each provided with an agitator 12.2, is shown. The ore is introduced through feedline 12.3 and oxygen under pressure is introduced through feedline 12.4. Water is introduced through feedline 12.5.

As an example of a typical reaction taking place in the autoclave 12, during the leaching process, the following equation is given:

$$4CuFeS_2 + 17O_2 + 4H_2O \rightarrow 4CuSO_4 + 4H_2SO_4 + 2Fe_2O_3$$

Iron is precipitated as hematite, whereas copper is dissolved and sulphuric acid is formed during the leaching process. Additional acid may be added to the autoclave 12, e.g. to dissolve the iron oxide, if desired. The product slurry will typically contain in the solution about 20–200 grams per liter Cu, 0.1–100 grams per liter Fe and about 20–100 grams per liter $H_2SO_4$. Depending on the final acidity of the solution, any iron present will precipitate out or remain in the solution.

The product slurry from the autoclave 12 is flashed down to atmospheric pressure in a flash tank 13 operating at about 90° C.–100° C.

The product slurry is then directed to a heap 14 for carrying out a heap leaching process. The heap 14 is in a closed circuit operation with a solvent extraction plant 16 in which the solvent extraction raffinate (aqueous stream left over after the copper has been extracted) is recycled to the top of the heap 14. The solvent extraction plant 16 in turn is in a closed circuit operation with an electrowinning plant 18.

The product slurry, which also includes all the solids produced by the agitation leaching process, such as iron solids and gangue minerals (silica, etc.) is first filtered, as shown at 20 in FIG. 1, and then the filtrate or product liquor is mixed with the recycled solvent extraction raffinate, prior to being applied to the heap 14, in a ratio of about 1:50, i.e. one part product slurry to about 50 parts raffinate by weight. However, it is conceivable that a ratio in a broader range of from about 1:50 to about 1:500 may be used.

The heap leaching process is carried out primarily to neutralize and filter the product liquor rather than for the purpose of leaching copper values from the heap itself, which, in the present example, comprises ordinary waste rock normally generated by a copper mine, or low grade copper ore piled up in dumps as run-of-mine waste. Such waste is uncrushed and typically contains large boulders of up to one meter across, together with considerable fine material. Copper values in most waste ore from open pit mines in British Columbia, Canada, is typically about 0.1% Cu. However, copper values can be higher in other countries. In general, the copper values in the waste rock is typically less than 1 or 2% of the total mass of rock. The rest of the rock is primarily gangue or silicates. Therefore, despite the fact that the main purpose is not to recover copper from the heap 14 itself, some useful leaching can take place. Any leaching which does take place is enhanced by the addition of the product slurry to the raffinate because it increases the acidity as well as the iron levels in the liquor being sprayed onto the heap 14. The low grade ore in the heap 14 may be sulphide ores or oxide ores, or both.

By passing the product slurry through the heap 14, neutralization of the acid and removal of dissolved iron in the leach liquor by the minerals in the waste rock is achieved. It has been found that in such heap leaching situations, an equilibrium condition appears to be established between the leach liquor and the heap 14 regarding acid and iron content. Thus, irrespective of the acid and iron content of the product slurry being poured onto the heap 14, and irrespective of the make-up of the waste heap 14, the acid and iron content of the resultant leach liquor coming off the bottom of the heap 14 is relatively constant in composition at about pH 1.5–2.0 and about 1–2 grams per liter Fe.

A possible explanation for this phenomenon is that minerals normally found in waste rock, such as feldspars and clays, reach an equilibrium condition with the solution when a large excess of rock over the solution, e.g., of about 100:1, is present, so that the rock does not become saturated. The feldspars and clays slowly absorb or neutralize the acid from the leach liquor and the degree of this reaction is dependent upon the strength of the acid solution. The net result is that the resultant pregnant leach liquor is always about the same in acidity and iron content. Therefore, the heap 14 may be composed of any rock which will serve this purpose and need not necessarily contain any copper ore.

The above explanation is given solely for the purpose of providing as much information as possible and is believed to be correct. However, in the event that in the future the explanation is found to be incorrect or imprecise, the applicant does not wish to be bound thereby.

The pregnant leach solution from the heap 14 is passed to the solvent extraction plant 16 and the electro-winning plant 18 to produce cathode copper. The raffinate is recycled to the top of the heap 14 as previously mentioned.

In the above example, the process was carried out with a predominantly chalcopyrite ore, but the process can also be carried out with other sulphide ores, such as ores containing bornite.

Tests have been carried out to determine the neutralization capacity of waste rock, both in finely ground form as well as in crushed form, firstly using only sulphuric acid and water and secondly using actual leach liquor as the source of acid. Tests have also been carried out to determine the effectiveness of the pressure leach stage by subjecting finely ground samples of concentrate to pressure leaching. These tests are described in more detail below but first a description of the samples of concentrate and waste rock used in the tests is given.

A. Samples of Concentrate used for Testwork

Samples of Cu concentrate for pressure leaching tests were obtained from two Cu mines in Canada, i.e. Gibraltar Mine at Williams Lake, B.C. (referred to as Mine "A") and Highland Valley Copper Mine near Kamloops, B.C. (referred to as Mine "B").

The Gibraltar concentrate is considered a fairly typical Cu concentrate, in terms of grade and mineralogy (chalcopyrite), whereas the Highland Valley concentrate is a high grade concentrate, due to the occurrence of bornite, a secondary Cu mineral with high Cu content in the ore.

B. Samples of Waste Rock used for Testwork

Samples of waste rock were obtained from the same two mines for use in neutralization tests. These were actually low grade Cu ore samples. The neutralization process involves the reaction of the various silicate minerals in the waste rock. Therefore, it is useful to have a description of the mineralogy of the waste rock samples. These two mines are both porphyry Cu mines, in which the host rocks are a complex series of aluminum silicates, with substantial amounts of lime, soda, potash, magnesia, iron oxides, etc. Assaying produced the following results (per cent by weight):

Deposits of the Canadian Cordillera, Part B—Porphyry Copper and Copper-Molybdenum Deposits of the Calc-Alkalic Suite—Paper 19, CIM Special Volume #15, published by Canadian Institute of Mining and Metallurgy) as having the following general composition:

| Quartz | $SiO_2$ | 25–30% |
|---|---|---|
| Plagioclase | a mixture of albite-epidote-zoisite-muscovite typically: $NaAlSi_3O_8$, $CaAl_2SiO_8$, $H_2KAl_3(SiO_4)_3$ | 50–55% |
| Chlorite | typically: $H_4Mg_3Si_2O_9$ | 10–20% |

In determining the actual mineral assemblage of the rock, specimens of the rock were prepared as thin sections, each incorporating two or three fragments of the predominantly macroscopically distinguishable rock types from a bag of rock chips. The rock fragments were found to consist mainly of quartz diorite, showing moderate to strong pervasive sericitization and epidotization, and a mineralized quartz-sericite rock, probably representing a sheared and intensely altered form of quartz diorite.

| Estimated composition | |
|---|---|
| Quartz | 31 |
| Plagioclase | 49 |
| Sericite | 8 |
| Epidote | 5 |
| Chlorite | 5 |
| Carbonate | 1 |
| Sphene | trace |
| Pyrite | 1 |
| Chalcopyrite | 0.2 |
| Fe oxides | trace |

The estimated composition was established by point counting of the various components in a series of random fields.

The predominant constituents were found to be quartz and plagioclase. The latter showed mild to locally intense sericitization, and was often more or less strongly dusted with minute granules of epidote. These same two components also occurred in coarser-grained form, concentrated as pockets in aggregates of quartz and/or feldspar. Minor carbonate was found to occur in like Chlorite was the characteristic mafic constituent.

Mineralogy of Sample 2

The host rock of Sample 2 is similarly described in general terms in the literature (See: "Valley Copper", by M. Osatenko and M. B. Jones, Paper 15, CIM Special

| Sample | Mine | Cu | Fe | S | Principal Cu Minerals |
|---|---|---|---|---|---|
| 1 | A | 0.33 | 2.40 | 0.96 | Chalcopyrite |
| 2 | B | 0.24 | 0.68 | 0.20 | Bornite, Chalcopyrite |

| | Whole Rock Analysis | | | | | | | | | |
|---|---|---|---|---|---|---|---|---|---|---|
| Sample | CaO | $K_2O$ | $P_2O_5$ | $SiO_2$ | $Al_2O_3$ | MgO | $Na_2O$ | $Fe_2O_3$ | $TiO_2$ | MnO | Total |
| 1 | 3.00 | 1.44 | 0.11 | 66.21 | 14.37 | 1.94 | 2.52 | 5.55 | 0.42 | 0.09 | 98.56% |
| 2 | 2.74 | 1.29 | 0.10 | 71.43 | 14.73 | 0.49 | 4.13 | 1.40 | 0.26 | 0.05 | 99.37% |

Mineralogy of Sample 1

The host rook of Sample 1 is described in the literature (See: "Gibraltar—Regional Metamorphism, Mineralization, Hydrothermal Alteration, and Structural Development", by A. D. Drummond et al, in Porphyry Volume #15, published by Canadian Institute of Mining and Metallurgy).

| Quartz | $SiO_2$ | 30% |
|---|---|---|
| Plagioclase | see above | 55% |

| | | | |
|---|---|---|---|
| K-Feldspar | KAlSi$_3$O$_8$ | | 10% |
| Biotite | Mg—Fe mica | | 5% | typically: H$_2$K(Mg,Fe)$_3$(Al,Fe)(SiO$_4$)$_3$

Specimens of this rock were prepared similarly to Sample 1 above as thin sections. The selected fragments were found to be mildly sericitized quartz diorite (quartz-plagioclase rock with minor altered mafics).

| Estimated composition | |
|---|---|
| Quartz | 37 |
| Plagioclase | 53 |
| Sericite | 6.5 |
| Hornblende | 0.3 |
| Biotite | trace |
| Chlorite | 1 |
| Carbonate | 1 |
| Chalcopyrite | 0.2 |
| Bornite | trace |
| Fe oxides | 1 |

Like Sample 1, it consisted predominantly of quartz and plagioclase. The plagioclase differed from that of Sample 1 in its lesser degree of pervasive alteration, being essentially fresh but for a mild argillic turbidity and a light dusting of minutely fine-grained sericite. Epidote was notably absent. The majority of the accessory sericite in this rock was found to occur as meshwork clusters of relatively coarse flakes, intergranular to quartz and/or feldspar. Mafics were found to be notably sparse. They consisted of chlorite, minor fresh hornblende and traces of biotite. Carbonate, Fe oxides and Cu and Fe sulphides were found to be minor accessories.

The results of the tests referred to above will now be described in the Examples below.

EXAMPLE 1: NEUTRALIZATION CAPACITY OF WASTE ROCK

Samples from each mine were tested for their (maximum) neutralization capacity by the following procedure (Sample 1 was tested more than once):

The samples were first subjected to crushing to about ¼" size in a laboratory jaw crusher, and then wet grinded in a small rod mill, to produce a slurry in which the solids were typically 99% minus 325 mesh. The slurry was removed from the rod mill and then further diluted to about 30% solids with water and put into an agitated vessel. Dilute sulphuric acid was then slowly added to the slurry to reduce the pH of the slurry from its natural value (near neutral) to pH 1.5. The pH was monitored at intervals over the next few hours and acid added as necessary to maintain the target pH 1.5. This procedure lasted for 24 hours. The temperature was ambient (about 25° C.).

The total volume of acid added was measured and at the conclusion of the 24 hour period, the slurry was filtered to produce a residue and a filtrate. The residue was dried and weighed and the filtrate volume measured. Some solution analyses were also carried out on the filtrate.

The results are as follows:

| Sample No. | Test No. | Vol. Slurry l. | Solids grams | pH Init. | pH Final | Acid Addition g/l | Acid Addition Vol. l. | Acid Addition Wt g. | Neutralization Capacity of rock kg acid/ton rock |
|---|---|---|---|---|---|---|---|---|---|
| 1 | 1 | 2.0 | 752 | 7.9 | 1.8 | 158 | .143 | 23 | 30 |
| 1 | 2 | 2.0 | 778 | — | 1.5 | 158 | .220 | 34.7 | 45 |
| 1 | 3 | 8.0 | 3165 | 8.3 | 1.5 | 158 | .810 | 128 | 40 |
| 2 | 4 | 15.0 | 4754 | — | 1.5 | 158 | 1.867 | 295 | 62 |

Solution analyses indicated that about 15% of both the Cu and Fe contained in the rock was leached during the tests.

The above results show that both types of rock (after fine grinding) absorb substantial amounts of acid, i.e. at pH 1.5, 40 kg acid and 62 kg acid per metric ton rock respectively for samples 1 and 2. Since finely ground rock probably reacts much faster than coarser (crushed) rock, these results represent the upper limits of neutralization capacity for the rock if it is used in crushed form rather than in a finely-ground form. In carrying out the method according to the invention, it is preferable to use the waste rock in coarse sizing, for economic reasons. Then the neutralization can be done on heaps of crushed or run-of-mine rock, rather than in agitated tanks, which require the extra expense of grinding as well as agitation, filtering, etc. The test procedure noted here does not indicate the rate at which the rock absorbs acid either, particularly the rate at which crushed rock reacts.

To obtain data on crushed rock, further tests were carried out as described below:

EXAMPLE 2: NEUTRALIZATION WITH CRUSHED WASTE ROCK, USING SYNTHETIC ACID.

A sample of rock from Mine A from the same lot as described above was crushed to about ¼" size and placed in a small glass column having a 2-inch diameter and 24 inches high. The column was placed upright and fitted with layers of plastic screen at the bottom of the column to hold the rock in place with plastic tubing connections to the top and bottom of the column. The total weight of rock placed in the column was 1865 grams (wet weight) at 3.54% moisture, or about 1798 g (approximately $1.8 \times 10^{-3}$ metric ton) of dry rock.

The tubing leading from the bottom of the column was connected to a small (product) reservoir, for collection of liquor draining out of the column. A second small (feed) reservoir was used to supply solution to the top of the column, by means of a small peristaltic pump, controlled by a timer.

The purpose of the test was to determine how much acid could be absorbed or reacted by the column of rock, by slowly percolating an acidic solution through the column of rock, and at which rate. For this test, the acid was supplied in two solutions, an initial solution and then a supplemental acid as required.

The initial solution was derived from Test #1 in Example 1 above, i.e. by agitation of a slurry of ground rock in dilute acid at pH 1.5 for 24 hours. The solution was separated from the solid fraction of the slurry as described by filtration to yield 1.08 liters. In addition, the filter cake was washed and the wash filtrate (0.62 liters) added to the first filtrate to give a total solution of 1.70 liters which was placed in the feed reservoir at the start of the test.

The supplemental acid was a (synthetic) solution prepared by mixing pure (98%) chemical grade $H_2SO_4$ with water, to obtain a dilute solution of acid, which was determined by filtration to contain 250 grams per liter $H_2SO_4$.

The test was started by slowly pumping the initial solution from the feed reservoir onto the top of the column and allowing it to percolate through the rock at a rate of approximately 550 milliliters per day, which corresponds to typical leaching rates used for heap leaching, i.e. 0.005 gallons per ft$^2$ per minute. The solution coming off the bottom of the column was collected in the product reservoir.

At suitable intervals (1-3 days typically) the product solution was sampled, pH measured and acid added to adjust the pH down to 1.5-1.7 range. This pH adjustment was made using the supplemental acid solution described. Then the (acidified) product solution was emptied into the feed tank and the process continued. Samples of the solution were assayed for dissolved Cu and Fe. A record was kept of total acid additions. The test was continued for 121 days.

Initially, the acid consumption was rapid, averaging about 1.2 kg acid/ton rock per day, for the first 20 days. It then decreased to about 0.1 kg acid/ton rock per day after 60 days and remained roughly constant at this rate until the end of the test.

The results are as follows:

| Days | pH | [Cu] ppm | [Fe] ppm | Acid Consumption gH$_2$SO$_4$ | Ratio | Rate | % Cu Leached from rock |
|---|---|---|---|---|---|---|---|
| 0 | 1.75 | 210 | 1189 | — | | — | — |
| 1 | 6.57 | — | — | — | | — | — |
| 20 | 1.67 | 790 | 2700 | 45 | 25 | 1.26 | 22 |
| 41 | 1.63 | 725 | 3305 | 56 | 31 | 0.28 | 21 |
| 62 | 1.68 | 610 | 2570 | 60 | 33 | 0.11 | 20 |
| 83 | 1.54 | 700 | 3700 | 66 | 37 | 0.16 | 24 |
| 100 | 1.52 | 750 | 3700 | 69 | 39 | 0.12 | 25 |
| 121 | 1.54 | 670 | 3500 | 73 | 41 | 0.09 | 25 |

The "ratio" in the above table is the ratio of the amount of acid consumed to the amount of rock present, i.e. $1.8 \times 10^{-3}$ ton rock. The "rate" refers to the rate of acid consumption as the daily rate over the last entry in the table, expressed as kg acid/ton rock per day.

The total acid consumption after 121 days was 41 kg acid per ton rock, which is similar to the values (average 38 kg/acid per ton rock), obtained with finely ground rock in 24 hours, as described in Example 1. Therefore, the neutralization with crushed waste rock appears to give similar final results, albeit at a much slower rate, as would be expected.

The amount of Cu and Fe leached from the rock is of interest also. Any Cu leaching from the waste rock will augment the Cu obtained from leaching concentrate. The results indicate that about 20% of the Cu in the rock leached very quickly, but after that Cu leaching practically stops. It is known that the Chalcopyrite (the predominant Cu mineral in this sample) leaches very slowly under these conditions, which approximate heap leaching, and even this low rate is dependent on bacterial action (bioleaching) to some extent. No attempt was made in these tests to introduce or cultivate bacteria, such as *thiobacillus ferrooxidans* or *thiobacillus thiooxidans*, which are well-known to improve leaching of Cu sulphide minerals. The 20% Cu that did leach may have been due to some surface oxidation on the sulphide particles.

The amount of Fe leaching is of interest for the following reasons: It is important that Fe in the neutralized liquor, coming off the bottom of the column, should stabilize at some reasonable value such as 1000 to 5000 ppm, rather than continue to build up as the solution is recirculated. In actual practice, neutralized liquor will go to solvent extraction where Cu is removed leaving a raffinate stream containing all the Fe which will go back onto the heap. Therefore, there is no removal mechanism for Fe from the circuit other than the heap itself, which should come to equilibrium with dissolved Fe at about 1000 to 5000 ppm, depending on the pH. Some Fe will leach from the minerals in the waste rock, but eventually this dissolution rate will be balanced by other chemical reactions such as hydrolysis which remove the Fe from solution, thus leading to a stable equilibrium value. The results in the above Example 2 indicate that indeed the Fe has stabilized at about 3700 ppm in solution.

The ratio of $Fe^{++}$ to $Fe^{+++}$ in the solution was monitored, along with the redox potential (Pt electrode vs. Ag/AgCl reference electrode):

| Days | [Fe$^{++}$] ppm | [Fe$^{+++}$] ppm | Redox mV |
|---|---|---|---|
| 0 | 1000 | 189 | 427 |
| 20 | 1750 | 950 | 415 |
| 41 | 2000 | 1305 | 420 |
| 62 | 150 | 2420 | 520 |
| 83 | — | — | 533 |
| 100 | — | — | 536 |
| 121 | 60 | 3440 | 541 |

The results show that initially the oxidation potential on the column was quite reducing, as evidenced by the high $Fe^{++}$ to $Fe^{+++}$ ratio and low redox potential. After about 60 days, the solution became more oxidizing, probably as a result of surface oxidation of the reducing minerals in the column of rock. There was no attempt to introduce or restrict the access of air to the column, so it is likely that some atmospheric oxygen gradually reacts with the rock minerals over time. The small size of the test equipment in this example, compared to a practical application, i.e. many thousands or millions of tons of rock on a heap, tends to give greater access to atmospheric oxygen than would be realized in a practical application. However, the same general principle is likely to be found, i.e. initial reducing conditions, slowly converting to more oxidizing over time. The neutralization process is not dependent on any special oxidation conditions and it is to be expected that it will work satisfactorily on the larger scale of actual heaps as well as on the micro scale of laboratory columns.

EXAMPLE 3: PRESSURE LEACHING OF CONCENTRATE

Concentrate samples were assayed for Cu, Fe and S:

|  | Cu | Fe | S |
|---|---|---|---|
| Gibraltar | 28.6 | 29.4 | 29.9% |
| Highland Valley | 41.4 | 22.2 | 28.0% |

Screen analyses of the concentrates as received were also carried out:

|  | −200 | −325 Mesh |
|---|---|---|
| Gibraltar | 86 | 39% |
| Highland Valley | 79 | 29% |

Both concentrates samples were subjected to regrinding in a laboratory rod mill for 35 minutes, in preparation for pressure leach testing. Screen analysis of the reground concentrates indicated 99% passing minus 325 mesh (44 micron).

Pressure leaching of the concentrates was done in a two liter titanium autoclave equipped with an agitator including two impellers, and a temperature control system including internal cooling coils and external heating system.

Leaching tests were cone in batch mode. The autoclave was charged with a fixed weight of concentrate and lixiviant before the test and all slurry products discharged completely from the vessel at the end of the test. The lixiviant used was water with no addition of acid. Oxygen used for the tests was high purity bottled oxygen. No other reagents were used in the tests.

The procedure used for the tests is as follows: The autoclave is charged with concentrate and water, closed up and sealed. The agitator is turned on. The autoclave is heated to about 180° C. by an external heating system. The autoclave is then pressurized with oxygen to 300 psig (approximately 2000 kPa). This marks the starting time. The temperature which rapidly increases to the reaction in the autoclave is controlled to remain in the region of 200°–210° C. by the use of a cooling system. During the test allowance is made for a small bleed of vent gas from the autoclave, while maintaining a pressure of 300 psig (approximately 2000 kPa) in the autoclave with an external oxygen cylinder. The test is continued for 60 minutes while the temperature is maintained about 200° C. At the end of 60 minutes the contents of the autoclave is cooled to about 95° C. The autoclave is depressurized and opened. All the slurry contents is then discharged using wash water as required. The combined slurry and washings is then filtered on a vacuum filter. The filter cake is washed with hot water, keeping the wash filtrate separate. The filter cake is then dried, weighed and analyzed. The filtrate and wash filtrate are also analyzed.

The results are as follows:

|  |  | TEST No. | |  |
|---|---|---|---|---|
|  |  | 1 | 2 |  |
| Feed Materials | | | | |
| Source of conc. | | Gibraltar | Highland Valley | |
| Concentrate wt (dry) | | 170 | 171 | grams |
| Water volume | | 1.0 | 1.0 | liters |
| Products | | | | |
| Filtrate | volume | 1.34 | 0.91 | liters |
|  | [Cu] | 35.8 | 78.3 | g/l |
|  | [Fe] | 0.7 | 0.4 | g/l |
|  | [H2SO4] | 40.0 | 30.6 | g/l |
| Wash | volume | 1.07 | 1.50 | liters |
|  | [Cu] | 1.4 | 2.0 | g/l |
| Residue | weight | 92.0 | 69.0 | grams |
|  | % Cu | 0.70 | 1.07 | % |
|  | % Fe | 43.2 | 43.2 | % |
| Cu Extraction | | 98.7 | 99.0 | % |
| Mass Balance on Cu | | | | |
| Cu in Feed material | | 48.6 | 70.6 | grams |

-continued

|  | TEST No. | |  |
|---|---|---|---|
|  | 1 | 2 |  |
| Cu in combined products | 50.1 | 75.0 | grams |
| % in Recovery | 103 | 106 | % |

In the above table, the "Cu extraction" referred to is calculated on the basis of Cu in the residue as a fraction of Cu in the feed concentrate. The "% recovery" referred to is defined as Cu in the combined products as % of Cu in feed materials.

The data indicate excellent Cu recovery to leach liquor from both concentrates by the pressure leaching process, with minimal solubilization of Fe. Most of the Fe, though oxidized, appears to hydrolyze as $Fe_2O_3$, or some hydrated form. The leach liquor contains excess acid in both cases, indicating that a high proportion of the sulphur in the concentrates is oxidized to the sulphate form. The results generally support the chemical reaction as given earlier for chalcopyrite in the concentrate:

$$4CuFeS_2 + 17O_2 + 4H_2O \rightarrow 4CuSO_4 + 4H_2SO_4 + 2Fe_2O_3$$

A corresponding reaction can be written for bornite, $Cu_5FeS_4$, giving the same products but in different ratios.

The solutions produced by these and similar pressure leach tests were used as the source of acidic leach liquor for the subsequent tests on neutralization using waste rock.

EXAMPLE 4: NEUTRALIZATION OF PRESSURE LEACH LIQUOR WITH WASTE ROCK

The test described in Example 2 above was repeated using actual pressure leach liquor as the source of acid, rather than a synthetic acid solution.

Separate tests were carried out on each of the two types of waste rock described, Gibraltar and Highland Valley, using the corresponding pressure leach liquor, as in Example 3.

The procedure used was essentially the same as in Example 2, with the product liquor coming off the bottom of the column being acidified to pH 1.5, and then this acidified product solution was used as the feed solution. Due to the Cu content of the leach liquor, this resulted in a considerable buildup of Cu in the recycling solution, i.e. 14 grams per liter Cu for the Gibraltar test, and 45 grams per liter Cu for the Highland Valley case, as no attempt was made at this stage to remove Cu from the product solution by solvent extraction.

The results are as follows:

Example 4A Gibraltar waste rock Column Test No. 1
Weight of Waste rock used in Column: 1824 grams
Composition of pressure leach liquor used for acidification:
Days 1–55: 52.5 g/l $H_2SO_4$, 47.8 g/l Cu
Days 56–83: 40.0 g/l $H_2SO_4$, 35.8 g/l Cu

| Days | pH | [Cu] ppm | [Fe] ppm | Acid Consumption | | | Volume of Leach liqr Used (mL) |
|---|---|---|---|---|---|---|---|
|  |  |  |  | g$H_2SO_4$ | Ratio | Rate |  |
| 0 | 1.63 | 283 | 1953 | 6.28 | 3.44 | — | — |
| 3 | 4.43 | 550 | 643 | 13.79 | 7.56 | 1.37 | 143 |
| 9 | 2.43 | 5230 | 2000 | 22.61 | 12.40 | 0.81 | 311 |
| 20 | 1.66 | 8500 | 2832 | 27.09 | 14.85 | 0.22 | 396 |
| 30 | 1.48 | 10125 | 3250 | 32.01 | 17.55 | 0.27 | 490 |

-continued

Example 4A Gibraltar waste rock Column Test No. 1
Weight of Waste rock used in Column: 1824 grams
Composition of pressure leach liquor used for acidification:
Days 1-55: 52.5 g/l $H_2SO_4$, 47.8 g/l Cu
Days 56-83: 40.0 g/l $H_2SO_4$, 35.8 g/l Cu

| Days | pH | [Cu] ppm | [Fe] ppm | Acid Consumption g$H_2SO_4$ | Ratio | Rate | Volume of Leach liqr Used (mL) |
|---|---|---|---|---|---|---|---|
| 40 | 1.88 | 10188 | 4588 | 39.59 | 21.70 | 0.42 | 634 |
| 59 | 1.58 | 14500 | 6300 | 48.58 | 26.63 | 0.26 | 814 |
| 83 | 1.55 | 14000 | 6700 | 53.77 | 29.48 | 0.12 | 944 |

Example 4B Gibraltar waste rock Column Test No. 2
Weight of Waste rock used in Column: 1864 grams
Composition of pressure leach liquor used for acidification:
Days 1-15: 30.6 g/l $H_2SO_4$, 78.3 g/l Cu
Days 15-18: 28.5 g/l $H_2SO_4$, 67.9 g/l Cu
Days 18-36: 25.8 g/l $H_2SO_4$, 55.0 g/l Cu
Days 36-40: 25.3 g/l $H_2SO_4$, 50.0 g/l Cu
Days 40-50: 26.8 g/l $H_2SO_4$, 53.7 g/l Cu
Days 50-68: 24.0 g/l $H_2SO_4$, 54.3 g/l Cu
Days 68-71: 16.5 g/l $H_2SO_4$, 35.5 g/l Cu

| Days | pH | [Cu] ppm | [Fe] ppm | Acid Consumption g$H_2SO_4$ | Ratio | Rate | Volume of Leach liqr Used (mL) |
|---|---|---|---|---|---|---|---|
| 0 | — | — | — | 6.24 | 3.35 | | |
| 5 | 5.53 | 170 | 374 | 10.75 | 5.77 | 0.48 | 147 |
| 11 | 3.95 | 11480 | 6320 | 27.58 | 14.74 | 1.50 | 698 |
| 13 | 3.61 | 17180 | 855 | 27.58 | 14.74 | — | 698 |
| 15 | 2.90 | 20550 | 1145 | 35.88 | 19.25 | 2.22 | 989 |
| 25 | 2.25 | 26375 | 3350 | 51.18 | 27.45 | 0.82 | 1582 |
| 36 | 1.73 | 32400 | 4000 | 60.89 | 32.67 | 0.47 | 1962 |
| 40 | 1.62 | 31450 | 5550 | 63.70 | 34.17 | 0.37 | 2067 |
| 50 | 1.50 | 42000 | 5950 | 68.92 | 36.97 | 0.28 | 2262 |
| 64 | 1.59 | 41100 | 8000 | 70.05 | 37.58 | 0.04 | 2309 |
| 71 | 1.56 | 41750 | 8000 | 73.28 | 39.31 | 0.13 | 2505 |

The results indicate that the absorption of acid by Gibraltar rock from actual pressure leach liquor is somewhat slower than for the corresponding test with synthetic acid, i.e. 30 kg acid consumed/tonne rock compared to 37 kg acid for the synthetic acid test, after the same time (83 days).

Similarly the amount of acid consumed by the Highland Valley rock is less after 71 days (39 kg acid/tonne rock) than by the corresponding test with ground rock (60 kg acid/tonne rock).

It appears therefore that the strong dissolved salts, Cu and Fe sulphates, have some effect on the amount of acid absorbed. It is expected that in the commercial plant, using solvent extraction, to keep Cu levels down to about 3-5 grams per liter Cu, will not suffer this effect nearly as much.

After the conclusion of the two tests in this Example, the rock was washed thoroughly with water to remove any entrained liquor, and subjected to mineralogical examination, to see what effect the acid neutralization tests may have had on the waste rock.

Evidence was found of conversion of silicates, i.e. feldspars to gypsum, in the fine fraction of the rock. These conclusions are tentative and must be confirmed by further investigation.

In situations where the concentrate contains significant precious metal values, such as gold and silver, the process of the invention includes a filtration step or other liquid-solid separation means for the flash tank slurry before application thereof to the heap 14. The solids obtained during the filtration step can then be removed for further treatment in a refinery.

It is an advantage of the process according to the invention that by combining the pressure leaching step with a percolation leaching step involving low grade ore or waste rock, the neutralization of the product slurry is economically and effectively carried out without the need for extraneous neutralizing agents. An additional advantage is that further copper values are simultaneously recovered during the neutralization process in situations where low grade copper ore is used in the percolation leaching step.

The result of the above is that low grade ore, containing less than 0.25% copper and as low as 0.1% copper can be successfully processed, whereas processing of such ores with the conventional processes would be uneconomical.

Figure 2:
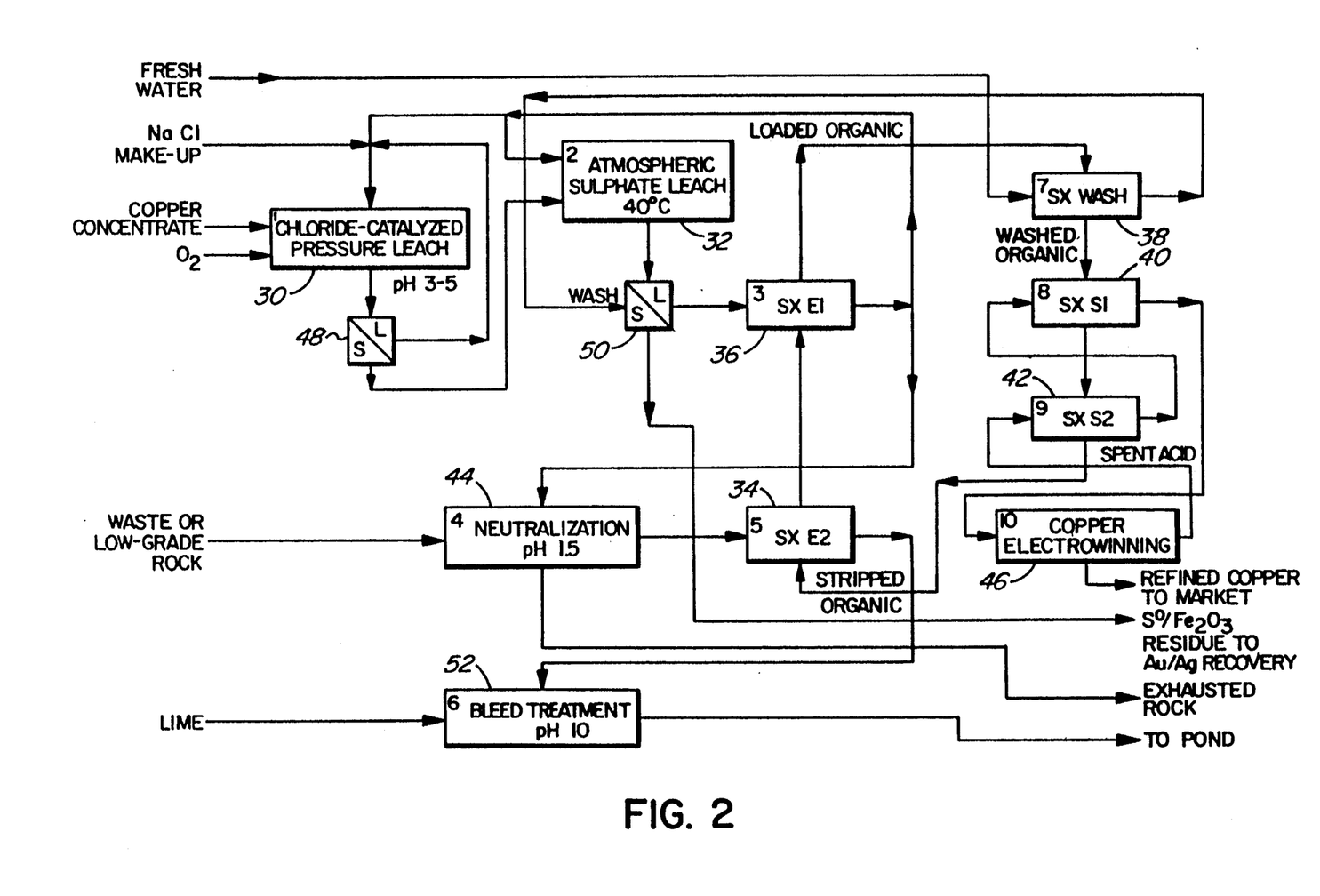
FIG. 2 is a flow diagram illustrating a copper extraction process according to another embodiment of the invention.

With reference now to FIG. 2, a copper extraction process according to another embodiment of the invention is illustrated.

The stages of the process are shown in the flow diagram of FIG. 2. The stages comprise a pressure leach stage 30, an atmospheric leach stage 32, first and second solvent extraction stages 34 and 36, respectively, a washing stage 38, first and second stripping stages 40 and 42, respectively, a neutralization stage 44 and an electrowinning stage 46. After each of the leaching stages 30 and 32, filtration is carried out as indicated at 48 and 50, respectively, to separate the liquids and solids.

The process will now be described in greater detail by way of a specific example in which a chalcopyrite ore is treated.

Copper concentrate is first ground in a ball mill to reduce the size of the particles to about 95% minus 325 mesh or smaller. Although satisfactory results are obtainable without regrinding, it has been found that there is a small but significant improvement with regrinding.

The concentrate is leached at an elevated pressure and temperature with a lixiviant containing about 3 grams per liter copper, 12 grams per liter chloride, 7 grams per liter sodium at a pH of about 3 to 5 (leaching stage 30). About 80-90% of the lixiviant is leach liquor which is recycled after the leaching stage 30 and filtration 48. The remaining 10-20% comprises raffinate from the subsequent solvent extraction step 36, to be described below.

The temperature of the leach 30 is about 150° C. and the pressure about 200 psig (1380 kPa). This is total pressure comprising oxygen pressure on top of the steam pressure. The retention time is about 2.5 hours in a batchwise process.

The solids content is maintained at about 11-13%, i.e. 120-150 grams per liter solids as determined by the heat balance. A higher percentage solids would require some form of heat removal to prevent the temperature from rising above the desired limit of 150° C.

Sodium chloride in solution is added as makeup to maintain the chloride concentration of the lixiviant at about 12 grams per liter.

The slurry produced by the leach 30 is cooled to below 100° C. and then filtered 48 to separate the residue from the leach liquor, which is recycled to the leaching stage 30 as noted above.

The residue contains the copper originally present in the concentrate as insoluble basic copper chloride and basic copper sulphate together with all the other solid elements, such as iron and sulphur.

There is a gain in the weight of the leach residue, typically it has 30-40% more weight than the feed concentrate. The leach residue contains about 0.5-2% chloride, as well as the copper, iron and sulphur, which is due to the presence of the basic copper chloride and the basic copper sulphate.

The iron in the chalcopyrite concentrate is converted almost completely to hematite, while sulphur is mostly converted to the elemental form with a fraction being oxidized to sulphate.

The leach liquor produced by the leaching step 30 has much the same composition as the feed lixiviant except that there is a drop in the chloride concentration from about 12 grams per liter to about 7-10 grams per liter, depending on the conditions, due to the formation of the basic copper chloride. Some sodium is also trapped in the residue.

The filter cake or leach residue is repulped in raffinate from the subsequent solvent extraction process 36, which comprises an acidic sulphate solution containing about 20-25 grams per liter $H_2SO_4$ and a small amount of copper (about 1-3 grams per liter). This second leaching step 32 takes place at atmospheric pressure and a temperature of about 40° C. for a retention time of about 60-120 minutes. The percentage solids is about 6% or about 70 grams per liter. The final acidity of the slurry is about pH 1.5-2.0 or about 2-5 grams per liter $H_2SO_4$.

During the atmospheric leach 32, the basic copper salts dissolve almost completely with very little of the iron going into solution. Typically, the leach liquor produced after filtration 50 contains about 15-20 grams per liter copper with less than 1 grams per liter iron and about 0.3-1.0 grams per liter chloride.

The percentage solids is kept low during the atmospheric leach 32 because higher copper concentrations cannot be treated satisfactorily by the subsequent solvent extraction circuit.

The copper extraction has been found to be about 97-98% based on the original feed to the pressure leach. Iron extraction to solution is less than about 5%.

The main constituents of the solid residue after filtration 50 are hematite and elemental sulphur, as well as any gold or silver which may have been present in the original concentrate. The sulphur can be recovered by screening or flotation to separate it from the hematite into a high-grade sulphur concentrate, which can be further treated for recovery of sulphur. The gold and silver can be recovered by cyanidation after sulphur is removed from the leach residue.

The copper leached from the atmospheric leach 32 is extracted by means of solvent extraction 36 to produce a loaded copper electrolyte suitable for electrowinning. After the solvent stage 36, the loaded organic extractant is subjected to one stage of wash 38 to remove chloride and two stages of stripping 40, 42. The high copper concentration of about 15-20 grams per liter derived from the atmospheric leach 32 provides significant advantages over conventional solvent extraction/electrowinning plants because much higher loading of the organic is possible, thus reducing the size of the plant for a given tonnage of copper. Stripping of the loaded organic is effected by means of spent acid from the electrowinning stage 46, to obtain a pure copper sulphate solution which is then passed to the electrowinning stage 46.

During the pressure leach 30, some of the sulphur present, which may be about 15-20% of the sulphur in the concentrate, is oxidized to sulphate. This is removed by subjecting about one-third of the raffinate from the atmospheric leaching step 32, after solvent extraction 36, to neutralization 44 by heap leaching waste rock or low grade ore with the raffinate. The remainder of the raffinate is recycled to the pressure leach and atmospheric leach steps 30 and 32, respectively.

The raffinate after solvent extraction 36 contains about 20-25 grams per liter acid and about 1-2 grams per liter copper and iron. During neutralization 44 the acid is reduced to about 2-5 grams per liter by contact with the silicate minerals in the rock, whilst copper passes through the heap leach. Iron will be hydrolyzed on the rock only if it builds up beyond its solubility limit, depending on the acidity. In addition, any copper minerals in the waste rock or low grade ore will be partly leached depending on the time of leaching, the type of mineral, bacterial activity, iron concentration, temperature, etc.

Solutions derived from the waste rock neutralization step 44 are passed to the first solvent extraction stage 34 to recover dissolved copper, typically 1-3 grams per liter using stripped organic. After solvent extraction 34, the raffinate is treated at 52 to remove soluble impurities derived from leaching, such as zinc and magnesium, which are not removed by the neutralization step. This is carried out by using lime at a pH 10-10.5. The final effluent from this process is suitable for disposal in a tailings pond. The partially loaded organic from the first solvent extraction stage 34 is passed on to the second solvent extraction stage 36.

The embodiment of FIG. 2 has been described using a chalcopyrite ore which does not contain any significant amounts of pyrite ($FeS_2$), resulting in little acid production during the pressure leaching stage. When treating ore containing significant amounts of pyrite, more acid is formed due to the oxidation of the pyrite to sulphate. In such cases a greater degree of neutralization is required and a greater proportion than one-third of the raffinate after the solvent extraction step 36, or indeed all the raffinate, may be subjected to neutralization 44 by heap leaching waste rock or low-grade ore with the raffinate and recycling the raffinate to either the pressure leach or atmospheric leach steps or to both the pressure leach and atmospheric leach steps 30, 32.

Figure 3:
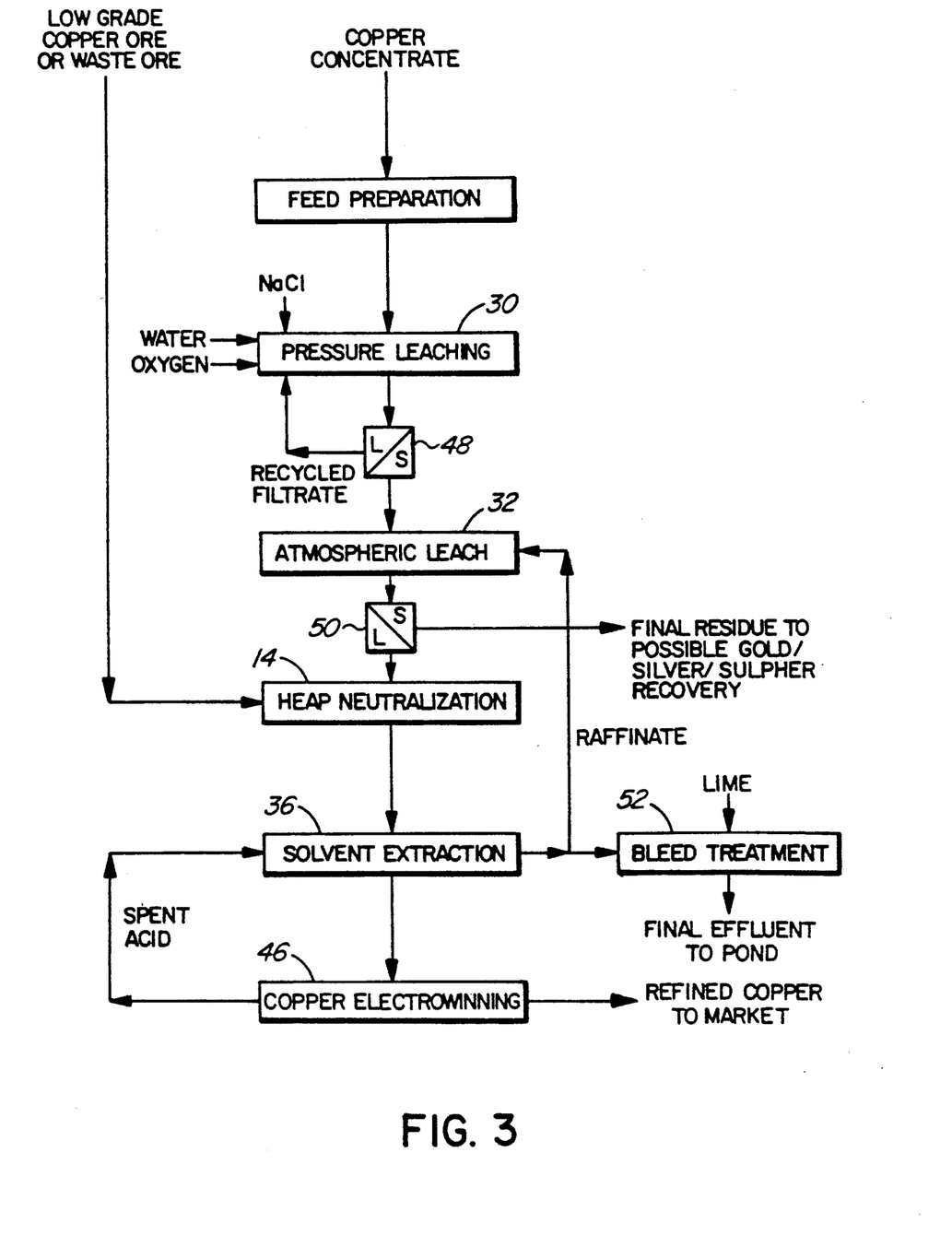
FIG. 3 is a flow diagram illustrating a copper extraction process according to a further embodiment of the invention.

In more drastic situations, where large amounts of acid is created, the neutralization step can be introduced prior to the solvent extraction step 36, as shown in the flow diagram of FIG. 3. Thus, in such a situation, the pressure leach and atmospheric leach steps 30 and 32 are followed by a heap leach step 14.

The solvent extraction 36 is operated in a closed circuit with the atmospheric leach step 32, whereby the raffinate after solvent extraction is recycled to the atmospheric leach step 32. Spent acid from the electrowinning step 46 is recycled to the solvent extraction step 36 to strip the copper from the loaded extractant. A bleed from the solvent extraction raffinate is subjected to lime treatment 52 to remove impurities and disposed of in a tailings pond.

In situations of acid formation, water is also introduced at the pressure leaching stage, as in the case of the FIG. 1 embodiment, to compensate for the water consumed in the reaction taking place during the pressure leaching.

While only preferred embodiments of the invention have been described herein in detail, the invention is not limited thereby and modifications can be made within the scope of the attached claims.

I claim:

1. A process for the extraction of copper from a sulphide copper ore or concentrate, comprising the steps of:

subjecting the ore or concentrate to a first leaching in the presence of oxygen and an acidic chloride solution as lixiviant;

subjecting the product from said first leaching to a second leaching with an acidic sulphate solution to produce a leach liquor containing copper sulphate in solution; and reducing the acidity of said leach liquor by effecting percolation leaching of a bed of copper ore with said leach liquor, whereby the pH of the leach liquor is raised.

2. The process according to claim 1, further comprising the step of a liquid-solid separation after said first leaching and recycling liquid obtained by said liquid-solid separation to serve as lixiviant for said first leaching and wherein solids obtained from said liquid-solid separation are subjected to said second leaching.

3. The process according to claim 1, wherein said bed is in the form of a heap and said percolation leaching comprises heap leaching.

4. The process according to claim 3, further comprising the step of subjecting the leach liquor from the percolation leaching to a solvent extraction process to produce a copper concentrate solution and a resulting raffinate and recycling said raffinate to said second leaching step.

5. The process according to claim 4, further comprising the step of subjecting said copper concentrate solution after the solvent extraction to an electrowinning process to produce cathode copper.

6. The process according to claim 1, further comprising the step of extracting dissolved iron in said leach liquor by subjecting the liquor to said percolation leaching.

7. A process for the extraction of copper from a sulphide copper ore or concentrate, comprising the steps of:

subjecting the ore or concentrate to a first leaching in the presence of oxygen and an acidic chlorine solution as lixiviant;

subjecting the product from said first leaching to a second leaching with an acidic sulphate solution to produce a leach liquid containing copper sulphate in solution; and reducing the acidity of said leach liquid by effecting percolation leaching of a bed of granular rock with said leach liquor, whereby the pH of the leach liquor is raised.

8. A process for the extraction of copper from a sulphide copper ore or concentrate, comprising the steps of:

leaching the ore or concentrate with an acidic chloride solution to produce an insoluble basic copper salt;

leaching the basic copper salt produced by the first leaching step with an acidic sulphate solution to dissolve the basic copper salt to produce a leach liquor containing copper sulphate in solution;

subjecting said leach liquor to a solvent extraction process to produce a copper concentrate solution and an acidic raffinate; and heap leaching a mass of copper ore by means of said acidic raffinate to raise the pH of said raffinate.

9. The process according to claim 8, wherein said insoluble basic copper salt comprises a mixture of basic copper chloride and basic copper sulphate.

10. The process according to claim 9, further comprising the step of recycling said raffinate from the heap leaching step to the second leaching step.

11. The process according to claim 9, further comprising the step of recycling said raffinate from the heap leaching step to the first leaching step.

12. A process for the extraction of copper from a sulphide copper ore or concentrate, comprising the steps of:

leaching the ore or concentrate with an acidic chloride solution to produce an insoluble basic copper salt;

leaching the basic copper salt produced by the first leaching step with an acidic sulphate solution to dissolve the basic copper salt to produce a leach liquor containing copper sulphate in solution;

subjecting said leach liquor to a solvent extraction process to produce a copper concentrate solution and an acidic raffinate; and heap leaching a mass of granular rock by means of said acidic raffinate to raise the pH of said raffinate.

* * * * *